United States Patent
Hayden et al.

(10) Patent No.: US 9,970,412 B2
(45) Date of Patent: May 15, 2018

(54) WIND TURBINE BLADE

(71) Applicant: Blade Dynamics Limited, Cowes, Isle of Wight (GB)

(72) Inventors: Paul Hayden, New Orleans, LA (US); Joaquin Gutierrez, New Orleans, LA (US)

(73) Assignee: BLADE DYNAMICS LIMITED, Isle of Wright (GB)

( * ) Notice: Subject to any disclaimer, the term of this patent is extended or adjusted under 35 U.S.C. 154(b) by 263 days.

(21) Appl. No.: 14/667,479

(22) Filed: Mar. 24, 2015

(65) Prior Publication Data
US 2015/0198141 A1 Jul. 16, 2015

Related U.S. Application Data

(63) Continuation of application No. PCT/GB2013/052376, filed on Sep. 11, 2013.

(30) Foreign Application Priority Data

Sep. 26, 2012 (GB) .................................. 1217212.8

(51) Int. Cl.
*F03D 1/06* (2006.01)
*F01D 5/28* (2006.01)
(Continued)

(52) U.S. Cl.
CPC ............. *F03D 1/0675* (2013.01); *F01D 5/28* (2013.01); *F01D 5/3092* (2013.01);
(Continued)

(58) Field of Classification Search
CPC .... F03D 1/0641; F03D 1/0633; F03D 1/0675; F03D 1/0683; F03D 13/10;
(Continued)

(56) References Cited

U.S. PATENT DOCUMENTS 2,767,461 A 10/1956 Lebold et al.
3,531,901 A 5/1966 Will, Jr. et al.
(Continued)

FOREIGN PATENT DOCUMENTS

| CN | 104769277 A | 7/2015 |
|---|---|---|
| DE | 3811427 | 5/1988 |

(Continued)

OTHER PUBLICATIONS

CN Office Action—Search Report dated Sep. 21, 2017.
(Continued)

*Primary Examiner* — Woody Lee, Jr.
*Assistant Examiner* — Sang K Kim
(74) *Attorney, Agent, or Firm* — Dority & Manning, PA

(57) ABSTRACT

A wind turbine blade comprising a fairing with a rigid structural component (12) which forms the majority of the aerodynamic profile and a non-actively controllable elastically deformable trailing edge component (14) mounted on the structural component to complete the aerodynamic profile. The trailing edge component (14) is formed from a material having an elastic modulus in the range of 0.5 to 2.5 GPa such it will elastically buckle when loading on the trailing edge component exceeds a predetermined threshold. The structural component (12) comprises a unidirectional reinforcing layer adjacent to the trailing edge component with at least one layer of unidirectional fibers (26) extending in a substantially spanwise direction.

27 Claims, 8 Drawing Sheets

(51) Int. Cl.
*F01D 5/30* (2006.01)
*F03D 13/10* (2016.01)

(52) U.S. Cl.
CPC ............ *F03D 1/0683* (2013.01); *F03D 13/10* (2016.05); *F05B 2240/311* (2013.01); *Y02E 10/721* (2013.01)

(58) Field of Classification Search
CPC ............ F05B 2240/31; F05B 2240/311; F05B 2240/313; F01D 5/3092; F01D 5/28; Y02E 10/721
See application file for complete search history.

(56) References Cited

U.S. PATENT DOCUMENTS

| | | | |
|---|---|---|---|
| 3,487,518 | A | 1/1970 | Hopefield |
| 3,980,894 | A | 9/1976 | Vary et al. |
| 4,120,998 | A | 10/1978 | Olez |
| 4,557,666 | A | 12/1985 | Baskin et al. |
| 4,580,380 | A | 4/1986 | Ballard |
| 4,643,646 | A | 2/1987 | Hahn et al. |
| 4,662,587 | A | 5/1987 | Whitener |
| 4,732,542 | A | 3/1988 | Hahn et al. |
| 4,752,513 | A | 6/1988 | Rau et al. |
| 4,976,587 | A | 12/1990 | Farone et al. |
| 5,096,384 | A | 3/1992 | Immell et al. |
| 5,145,320 | A | 9/1992 | Blake et al. |
| 5,273,819 | A | 12/1993 | Jex |
| 5,281,454 | A | 1/1994 | Hanson |
| 5,670,109 | A | 9/1997 | Derees |
| 5,735,486 | A | 4/1998 | Piening et al. |
| 6,139,278 | A | 10/2000 | Mowbray et al. |
| 6,287,666 | B1 | 9/2001 | Wycech |
| 6,295,779 | B1 | 10/2001 | Canfield |
| 6,332,301 | B1 | 12/2001 | Goldzak |
| 7,160,085 | B2 | 1/2007 | De Roest |
| 7,267,868 | B2 | 9/2007 | Gallet et al. |
| 7,334,989 | B2 | 2/2008 | Arelt |
| 7,360,993 | B2 | 4/2008 | Fraenkel |
| 7,371,304 | B2 | 5/2008 | Christman et al. |
| 7,438,524 | B2 | 10/2008 | Lyders et al. |
| 7,632,068 | B2 | 1/2009 | Bak et al. |
| 7,625,185 | B2 | 12/2009 | Wobben |
| 7,810,757 | B2 | 10/2010 | Kirkwood et al. |
| 7,966,726 | B2 | 6/2011 | Schibsbye |
| 7,976,275 | B2 | 7/2011 | Miebach et al. |
| 8,012,229 | B1 | 9/2011 | Hancock |
| 8,079,818 | B2 | 12/2011 | Burchardt et al. |
| 8,096,750 | B2 | 1/2012 | McEntee et al. |
| 8,167,569 | B2 | 5/2012 | Livingston |
| 8,172,542 | B2 * | 5/2012 | Hirano ............... F03D 1/0675 416/226 |
| 8,192,572 | B2 | 6/2012 | Willey et al. |
| 8,348,622 | B2 | 1/2013 | Bech |
| 8,393,865 | B2 * | 3/2013 | Vronsky ............... F03D 1/0641 416/23 |
| 8,419,363 | B2 * | 4/2013 | Madsen ............... F03D 1/0633 416/13 |
| 8,500,408 | B2 | 8/2013 | Baker et al. |
| 8,517,682 | B2 | 8/2013 | Hancock |
| 8,602,732 | B2 * | 12/2013 | Wilson ............... F03D 1/0641 416/132 B |
| 8,696,317 | B2 | 4/2014 | Rudling |
| 8,764,401 | B2 | 7/2014 | Hayden et al. |
| 8,801,386 | B2 | 8/2014 | Keir et al. |
| 8,807,954 | B2 | 8/2014 | Gill |
| 8,905,718 | B2 | 12/2014 | Hayden et al. |
| 9,033,664 | B2 | 5/2015 | Hayden et al. |
| 9,039,372 | B2 * | 5/2015 | Hancock ............... F03D 1/0675 416/146 R |
| 9,068,559 | B2 | 6/2015 | Hancock et al. |
| 9,086,054 | B2 | 7/2015 | Loh et al. |
| 9,133,818 | B2 | 9/2015 | Hayden et al. |
| 9,181,701 | B2 | 11/2015 | Hofmann |
| 9,388,789 | B2 | 7/2016 | Hibbard et al. |
| 9,518,564 | B2 | 12/2016 | Dagher et al. |
| 9,651,029 | B2 | 5/2017 | Hayden et al. |
| 9,863,258 | B2 | 1/2018 | Hayden et al. |
| 2002/0053179 | A1 | 4/2002 | Wycech |
| 2004/0018091 | A1 | 1/2004 | Rongong et al. |
| 2004/0023581 | A1 | 2/2004 | Bersuch et al. |
| 2004/0226255 | A1 | 11/2004 | Holloway |
| 2005/0106029 | A1 | 5/2005 | Kidegaard |
| 2006/0070340 | A1 | 4/2006 | Fanucci et al. |
| 2006/0083611 | A1 | 4/2006 | Wobben |
| 2006/1277222 | | 6/2006 | Arelt |
| 2006/0145031 | A1 | 7/2006 | Ishikawa et al. |
| 2006/0152011 | A1 | 7/2006 | Fraenkel |
| 2007/0036659 | A1 | 2/2007 | Hibbard |
| 2007/0140861 | A1 | 6/2007 | Wobben |
| 2007/0189903 | A1 | 8/2007 | Eyb |
| 2007/0264124 | A1 | 11/2007 | Mueller et al. |
| 2008/0069699 | A1 | 3/2008 | Bech |
| 2008/0075603 | A1 | 3/2008 | Van Breugel |
| 2009/0068017 | A1 | 3/2009 | Rudling |
| 2009/0075084 | A1 | 3/2009 | Kochi et al. |
| 2009/0104038 | A1 * | 4/2009 | Grabau ............... F03D 1/0641 416/219 R |
| 2009/0162206 | A1 | 6/2009 | Zirin et al. |
| 2009/0162208 | A1 | 6/2009 | Zirin et al. |
| 2009/0226320 | A1 | 9/2009 | Martinez |
| 2009/0226702 | A1 | 9/2009 | Madsen et al. |
| 2009/0246446 | A1 | 10/2009 | Backhouse |
| 2009/0252614 | A1 | 10/2009 | Schibsbye |
| 2010/0047070 | A1 | 2/2010 | Slot et al. |
| 2010/0062238 | A1 | 3/2010 | Doyle et al. |
| 2010/0084079 | A1 | 4/2010 | Hayden et al. |
| 2010/0086409 | A1 | 4/2010 | Whiley et al. |
| 2010/0116938 | A1 | 5/2010 | Kline et al. |
| 2010/0127504 | A1 | 5/2010 | Hancock |
| 2010/0132884 | A1 | 6/2010 | Baehmann |
| 2010/0135817 | A1 | 6/2010 | Wirt et al. |
| 2010/0140947 | A1 | 6/2010 | McEntee et al. |
| 2010/0143143 | A1 | 6/2010 | Judge |
| 2010/0143146 | A1 | 6/2010 | Bell et al. |
| 2010/0162567 | A1 | 7/2010 | Kirkwood et al. |
| 2010/0310379 | A1 | 12/2010 | Licingston |
| 2011/0036495 | A1 | 2/2011 | Cinquin |
| 2011/0138707 | A1 | 6/2011 | Bagepalli |
| 2011/0175365 | A1 | 7/2011 | Hines et al. |
| 2011/0176915 | A1 | 7/2011 | Keir et al. |
| 2011/0200446 | A1 | 8/2011 | Garcia |
| 2011/0318186 | A1 | 12/2011 | Kristensen et al. |
| 2012/0027610 | A1 | 2/2012 | Yarbrough |
| 2012/0045343 | A1 | 2/2012 | Hancock et al. |
| 2012/0141283 | A1 | 6/2012 | Bell et al. |
| 2012/0294724 | A1 | 11/2012 | Broome et al. |
| 2013/0022472 | A1 | 1/2013 | Hayden et al. |
| 2013/0236327 | A1 | 9/2013 | Wirz |
| 2013/0340384 | A1 | 12/2013 | Hayden et al. |
| 2013/0340385 | A1 | 12/2013 | Hayden et al. |
| 2014/0086752 | A1 | 3/2014 | Hayden et al. |
| 2014/0234109 | A1 | 8/2014 | Hayden et al. |
| 2014/0271217 | A1 * | 9/2014 | Baker ............... F03D 1/0633 416/226 |
| 2015/0198141 | A1 | 7/2015 | Hayden et al. |

FOREIGN PATENT DOCUMENTS

| | | | |
|---|---|---|---|
| DE | 3811427 | 10/1989 | |
| DE | 19737966 | 8/1998 | |
| DE | 20320714 | 1/2005 | |
| EP | 0863358 | 9/1998 | |
| EP | 1262614 | 12/2002 | |
| EP | EP 2455609 A2 * | 5/2012 | ............ F03D 1/0675 |
| FR | 2710871 | 4/1995 | |
| FR | 2863321 | 6/2005 | |
| GB | 1229595 | 4/1971 | |
| GB | 2041829 | 9/1980 | |
| GB | 2372784 | 4/2002 | |
| JP | 2000120524 | 4/2000 | |
| JP | 2006248456 | 9/2006 | |
| JP | 2006336555 | 12/2006 | |

(56) References Cited

FOREIGN PATENT DOCUMENTS

| JP | 2007209923 | 8/2007 | |
|---|---|---|---|
| KR | 20120077650 | 7/2012 | |
| WO | WO 97/30651 | 8/1997 | |
| WO | WO 03/035380 | 5/2003 | |
| WO | WO 03/057457 | 7/2003 | |
| WO | WO 2008/136717 | 11/2008 | |
| WO | WO 2011/029882 A2 | 3/2011 | |
| WO | WO 2011/088834 A2 | 7/2011 | |
| WO | WO 2012103891 A2 * | 8/2012 | ........... F03D 1/0641 |

OTHER PUBLICATIONS

Jackson K. J., et al, Innovative Design Approaches for Large Wind Blades, Wind Energy 2005: vol. 8; pp. 141-171, published online Nov. 29, 2004 in Wiley Interscience (www.interscience.wiley.com).
Sandia Report prepared by Sandia National Laboratories, SAND2003-0723, Unlimited Release, Printed Mar. 2003, Innovative Design Approaches for Large Wind Turbine Blades, pp. 1-43.
PCT/GB2013/052376 International Search Report and Written Opinion, dated Nov. 26, 2013, 10 pages.
GB1217212.8 Search Report, dated Jan. 24, 2013, 6 pages.

\* cited by examiner

WIND TURBINE BLADE

INCORPORATION BY REFERENCE TO ANY PRIORITY APPLICATIONS

This application is a continuation of Patent Cooperation Treaty International Patent Application PCT/GB2013/052376, filed Sep. 11, 2013, and entitled "WIND TURBINE BLADE," which is incorporated by reference herein in its entirety, and which claims priority to United Kingdom Patent Application GB1217212.8, filed on Sep. 26, 2012.

BACKGROUND

Field

The present invention relates to wind turbine blades.

Description of the Related Art

Wind turbines typically include one or more blades to capture the kinetic energy of the wind. During use, the blades are subject to various aerodynamic and inertial loads which typically occur in the edgewise direction and in the flapwise direction. Edgewise loads are those parallel to the chord of the blade, while flapwise loads are perpendicular to the edgewise direction. The direction of these loads can be seen in FIG. 1, in which "x" denotes the direction of edgewise loads and "y" denotes the direction of flapwise loads.

In order to increase the proportion of available wind energy captured by a particular wind turbine, it is known to increase the length of the blades to increase the swept area of the turbine. However, as each blade rotates, inertial and aerodynamic forces along the blade result in an edgewise loading. As the blade passes the tower until it reaches the azimuth, the trailing edge of the blade is compressed due to gravitational loading. Furthermore, in some cases where the rotor is accelerating, such as start up and grid loss, the trailing edges of the blades have additional compressive loading. This may cause buckling of the trailing edge, as shown in FIG. 2.

To prevent buckling of the trailing edge, it is known to add reinforcing material to the blade in order to increase its rigidity. For example, in large blades it is known to increase the thickness of the undercamber in order to increase the rigidity of the blade in the region of the trailing edge, as shown in FIG. 3.

However, this increases the thickness of the trailing edge, resulting in greater levels of noise, poor aerodynamic performance and parasitic mass. Further, this effect is exacerbated in longer blades (>45 m) since the linear velocity of a wind turbine blade is proportional to the rotor diameter and higher speeds create more noise.

It is also known to apply an adhesive reinforcing tape to the outer surface of the fairing in the region of the trailing edge, particularly in the case of blades having aerodynamic fairings made of fibre reinforced plastic. Since the rigidity of the blade is lowest at the trailing edge tip and the compressive loading is greatest at this point, the reinforcing tape is typically placed as close as possible to the tip of the trailing edge. However, this also results in an increase in the thickness of the trailing edge, resulting in greater levels of noise.

US Patent Application Publication No. 2010/0047070 discloses a blade with a sacrificial plastic element fixed into the trailing edge to prevent the otherwise periodical alternating vortex shedding from the trailing edge. Although this document expresses a preference for the plastic element to have a sharp edge, it does not specify any particular requirement for the shape of the plastic element. Some examples have a flexible strip on the top and bottom surfaces of the plastic element to act as lightning protection

SUMMARY

According to a first aspect of the present invention, there is provided a wind turbine blade comprising a fairing having an aerodynamic profile, the fairing comprising a rigid structural component which forms the majority of the aerodynamic profile, and a non-actively controllable elastically deformable trailing edge component mounted on the structural component to complete the aerodynamic profile, wherein the trailing edge component is formed from a material having an elastic modulus in the range of 0.5 to 2.5 GPa such that it will elastically buckle when loading on the trailing edge component exceeds a predetermined threshold, wherein the structural component comprises a unidirectional reinforcing layer adjacent to the trailing edge component, the unidirectional reinforcing layer comprising at least one layer of reinforcing fibres extending in a substantially spanwise direction.

With this arrangement, the opposing requirements of noise reduction and structural rigidity are decoupled. Specifically, the unidirectional reinforcing layer increases the rigidity of the trailing edge of the blade, particularly in its ability to resist compression caused by edgewise loading while the trailing edge component reduces the level of noise. Thus, the presence of the elastically deformable trailing edge component allows the structural component to retain a greater thickness so that there is sufficient room for it to be reinforced with the uni-directional reinforcing layer. This increases the resistance of the blade to permanent buckling without any corresponding increase in the noise levels generated. When the blade is subjected to extreme loading conditions in which the threshold is exceeded, the trailing edge can flex and buckle before recovering its original shape when the loading conditions return to normal and the loading on the trailing edge component falls below the threshold. Thus, aerodynamic performance can be maintained below the loading threshold, for example during normal operating conditions, without experiencing buckling damage of the blade during extreme conditions and without the need for sacrificial components.

"Extreme" operating conditions are considered to be those which result in the maximum anticipated compressive loading of the trailing edge, e.g. during a grid loss, or in winds with a recurrence period of 50 to 100 years.

In addition, if the trailing edge is damaged either during transport, installation, or in use, the structure of the blade is not compromised and the trailing edge component can simply be replaced.

The requirement for uni-directional fibers extending in a substantially spanwise direction means that at least some of the fibres can deviate from an exactly spanwise direction. The overriding requirement is that the uni-directional fibers resist compression caused by edgewise loading to a significant extend and the term should be understood in this context.

The invention bears a superficial relationship to blades such as those disclosed in US Patent Application Publication No. 2009/0290982. These have a trailing edge component which can be actively driven to alter the profile of the blade. The present invention is conceptually different in that the trailing edge component is non-actively controllable and is deflected only as a result of forces induced by the effects of the blade travelling through the air during extreme loading cases. In effect it is a passive component, while those of US 2009/0290982 are active and require the provision of a controller and drive mechanism.

The invention also bears a superficial relationship to US Patent Application Publication No. 2012/0141274. This discloses a wind turbine blade including a main foil section and a trailing edge section which may be separately formed from and coupled to the main foil section to define the trailing edge section of the blade. The trailing edge section is pivotal relative to the main foil and is biased to a low wind speed position in order to better capture wind energy at lower wind speeds. As the wind speed and loading on the blade increases from zero, the trailing edge section pivots towards an optimum wind speed position in which the trailing edge axis is in line with that of the main foil section. Thus, in contrast to the present invention, the trailing edge component deforms or pivots when loading is under a certain threshold, rather than when the threshold is exceeded. In fact, US 2012/0141274 describes the use of a stop mechanism to prevent the trailing edge from pivoting beyond the optimal wind speed position when the optimal wind speed threshold is exceeded.

The invention also bears a superficial relationship to Japanese Patent Publication No. 2000/120524, which discloses a wind turbine blade with a separate trailing edge component. By forming the trailing edge as a separate component, the trailing edge thickness can be reduced relative to that typically obtainable with large blades. This inhibits the generation of Karman vortices and reduces the noise produced by the blade. However, there is no reinforcement in the region of the trailing edge. In addition, the trailing edge component is divided into a number of discrete longitudinal sections to avoid buckling.

The unidirectional reinforcing layer may be present only in the region of the trailing edge of the fairing. In a preferred embodiment, the structural component further comprises an additional unidirectional reinforcing layer adjacent to its leading edge, the additional unidirectional reinforcing layer comprising at least one layer of unidirectional fibres extending in a substantially spanwise direction.

With this arrangement, the edgewise rigidity of the fairing in the region of the leading edge is increased and this has been found to further reduce buckling of the trailing edge.

The structural component may be formed from any suitable material. Also, the reinforcing layers may be adhered to the outer surface of the structural component. In a preferred embodiment, the structural component is formed from a fibre reinforced plastic and the unidirectional reinforcing layer and/or the additional unidirectional reinforcing layer is co-cured with the fibre reinforced plastic such that it is an integral part of the structural component. This allows more control over the rigidity characteristics of the blade and prevents damage to or removal of the reinforcing layer as may be the case with reinforcing tapes.

The unidirectional reinforcing layer and/or the additional unidirectional reinforcing layer may comprise a single layer of reinforcing fibre and/or may be uniformly thick. In a preferred embodiment, the unidirectional reinforcing layer and/or the additional unidirectional reinforcing layer comprises a concentrated region of at least two, preferably at least five, more preferably 8 to 10, layers of unidirectional fibres extending in a substantially spanwise direction. This ensures that the fairing is made more rigid in areas where buckling can be a problem, without unnecessarily increasing the thickness and weight of the fairing in other less critical areas.

All of the reinforcing layer could be in the concentrated region and/or be of constant thickness. Alternatively, the reinforcing layer could be formed of the concentrated region and a thinner region.

The concentrated region may be formed entirely of unidirectional fibres extending in a substantially spanwise direction. Alternatively, the concentrated region comprises at least five layers of unidirectional fibres extending in a substantially spanwise direction and at least one layer of multiaxial fibres, for example biaxial fibres at ±45° to the direction of the unidirectional fibres. A layer of multiaxial fibres acts to increase the resistance of the reinforcing layer to transverse cracking and can assist the manufacture of the fairing by improving the air flow through the mould to allow air to be more easily drawn out of the mould under a vacuum.

The ratio of unidirectional to multiaxial fibres in the unidirectional reinforcing layer may be less than 5:1. In a preferred embodiment, the ratio of the layers of unidirectional to multiaxial fibres is at least 5:1.

The concentrated region may extend along substantially the entire span of the fairing. Preferably, it extends along less than half of the span of the fairing, more preferably along approximately ⅓ to ¼ the span.

The concentrated region may be positioned anywhere along the blade. In a preferred embodiment, the concentrated region is in a central region of the blade.

The reinforcing layer may be absent from the root and/or tip ends of the blade, or be one layer thick in these regions. Preferably, the unidirectional reinforcing layer and/or the additional unidirectional reinforcing layer comprises at least two layers of unidirectional fibres, extending in a substantially spanwise direction, in the vicinity of the root end of the blade. This increases the rigidity of the blade in the region of the root end, where loading can be high, particularly with very large blades.

The chordwise dimension of the trailing edge component may be constant along the span of the fairing. In a preferred embodiment, the chordwise dimension of the trailing edge component increases, preferably gradually, in the spanwise direction towards the blade tip. With this arrangement, the trailing edge component forms an increasing proportion of the aerodynamic profile in the tipwise direction. This allows the unidirectional reinforcing layer adjacent to the trailing edge component to be made thicker to further strengthen the structural component in areas where the moment of inertia of the fairing is lower but the compressive forces are high.

The trailing edge component may be present along the entire length of the blade. Alternatively, the trailing edge component may be absent in certain areas of the blade and the structural component tapered towards its trailing edge in these areas. In a preferred embodiment, the structural component has a blunt trailing edge, or "flat back" in the vicinity of the blade root and the trailing edge component is absent at this point.

The reinforcing layers may extend in the spanwise direction beyond or as far as the trailing edge component. Preferably, the trailing edge component extends in a spanwise direction beyond the spanwise extent of the unidirectional reinforcing layer and/or the additional unidirectional reinforcing layer. The trailing edge component may extend beyond the reinforcing layers towards the blade root. Preferably, the trailing edge component extends in a spanwise direction beyond the spanwise extent of the unidirectional reinforcing layer and/or the additional unidirectional reinforcing layer towards the blade tip.

Preferably, the trailing edge component is formed from a material which is able to sustain elastically a strain of greater than 2%.

The trailing edge component may be made from any suitable material. Preferably, it is made from a material selected from a group including, but not limited to, rubber, silicon, acetal, ABS, nylon, acrylic, PBT, PET, polypropylene, PU, TPO, and polyethylene.

The trailing edge tip of the trailing edge component, i.e. the rearmost edge of the trailing edge component, may be of any suitable thickness. Preferably, the trailing edge component has a trailing edge tip thickness of less than 5 mm. This reduces the level of noise generated at the trailing edge of the blade.

Preferably, the chordwise dimension of the trailing edge component at its widest point represents less than 25% of the chord length of the aerodynamic profile.

In a preferred embodiment, the chordwise dimension of the trailing edge component is at its widest point inward of the blade tip and decreases from its widest point towards the blade tip.

The trailing edge component may extend in a spanwise direction all the way to the blade tip such that the trailing edge of the aerodynamic profile of the fairing is defined by the trailing edge component at that point. Preferably, the trailing edge of the aerodynamic profile at the blade tip is formed by the structural component, whereas the trailing edge component is absent at this point. With this arrangement, the trailing edge component is present only in the regions of the trailing edge which are susceptible to buckling.

Preferably, the trailing edge component comprises a unitary piece extending across at least 1 meter of the span of the fairing, preferably the unitary piece extends across 10 meters of the span of the fairing, more preferably the unitary piece extends across 20 meters of the span of the fairing.

The structural component may have an open-ended cross-section. In a preferred example, the structural component has a closed cross-section. The trailing edge end of the closed cross-section, i.e. the rearmost end of the structural component, may be defined by a structural wall on which the trailing edge component is mounted.

The trailing edge component may be pivotally mounted on the structural component. Preferably, the trailing edge component is non-pivotally mounted on the structural component.

The trailing edge component may be mounted on the structural component using a groove and boltrope arrangement and/or a locking clip.

There may be a step or gap between the structural component and the trailing edge component. In a preferred example, the aerodynamic profile formed by the structural component and the trailing edge component is continuous. In other words, there is no step between the structural component and the trailing edge component. The transition between the outer surfaces of the structural component and the trailing edge is smooth. This encourages laminar flow over the surface of the fairing to reduce drag and noise.

According to a second aspect of the present invention, there is provided a method of preventing buckling of the trailing edge of a wind turbine blade having an fairing with an aerodynamic profile, the method comprising the steps of providing a rigid structural component to form the majority of the aerodynamic profile, mounting a non-actively controllable elastically deformable trailing edge component on the structural component to complete the aerodynamic profile, wherein the trailing edge component is formed from a material having an elastic modulus in the range of 0.5 to 2.5 GPa and wherein the structural component comprises a unidirectional reinforcing layer adjacent to the trailing edge component, the unidirectional reinforcing layer comprising at least one layer of unidirectional fibres extending in a substantially spanwise direction, and allowing the trailing edge component to buckle when loading on the trailing edge component exceeds a predetermined threshold.

BRIEF DESCRIPTION OF THE DRAWINGS

An example of the present invention will now be described with reference to the following drawings in which.

DETAILED DESCRIPTION

Figure 1:
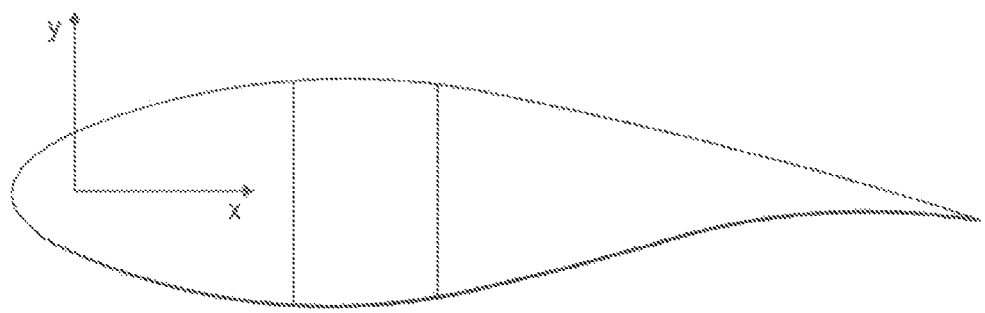
FIG. 1 is a schematic section view of a wind turbine blade, which shows the edgewise and flapwise load directions and is included for background interest only.
Figure 2:
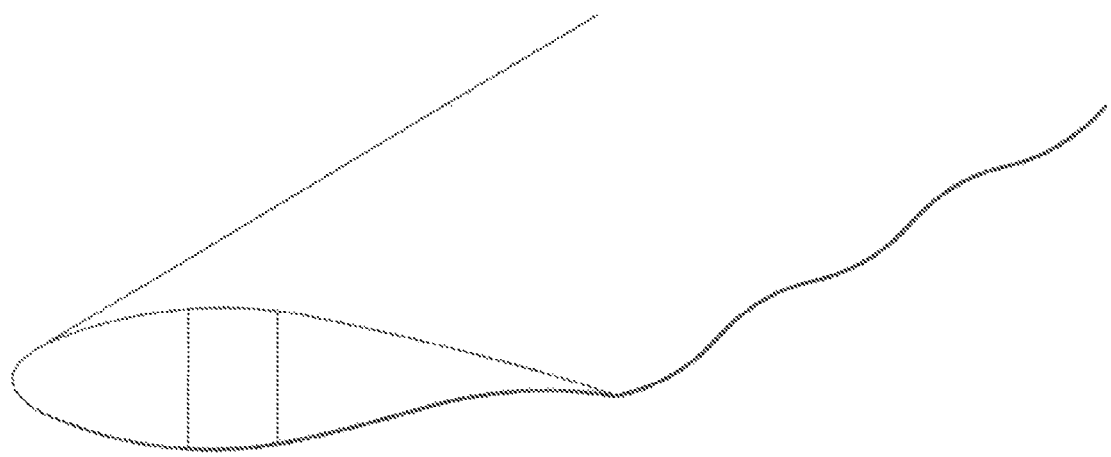
FIG. 2 is a schematic isometric section view of a wind turbine blade, which is included for background interest only and which shows buckling of the trailing edge.
Figure 3:
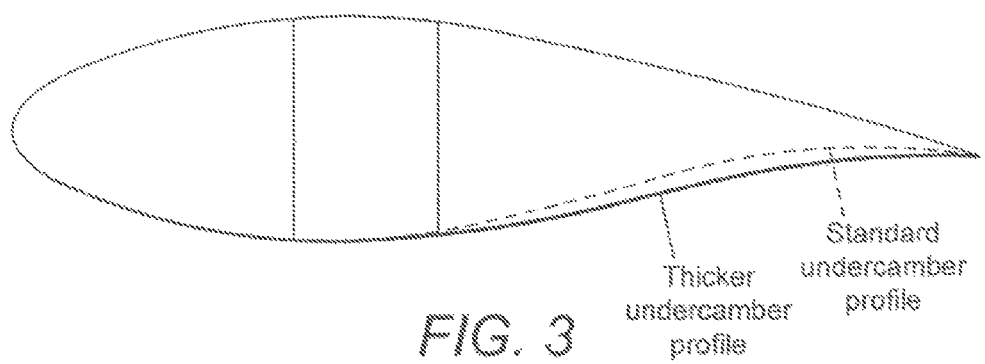
FIG. 3 is a schematic section view of a wind turbine blade, which is included for background interest only and which shows a standard undercamber profile along with a thicker undercamber profile used to increase the rigidity of the trailing edge of a conventional blade.
Figure 4:
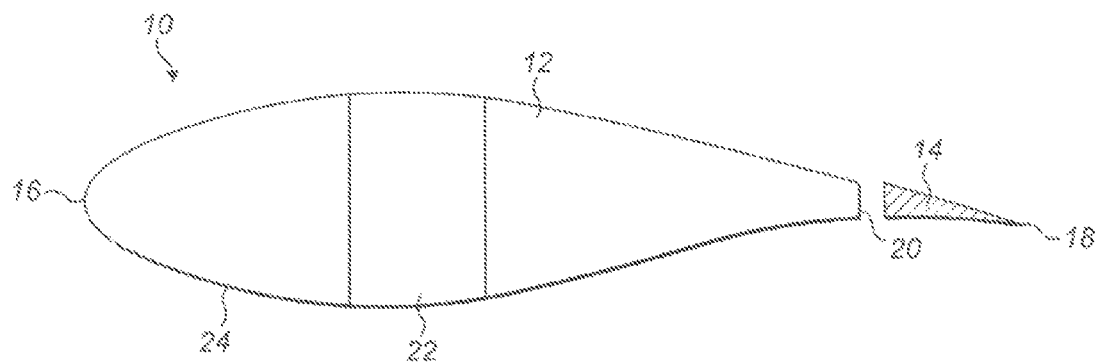
FIG. 4 is a schematic section view of a wind turbine blade in accordance with the present invention, showing the structural component and the trailing edge component as separate.
Figure 5:
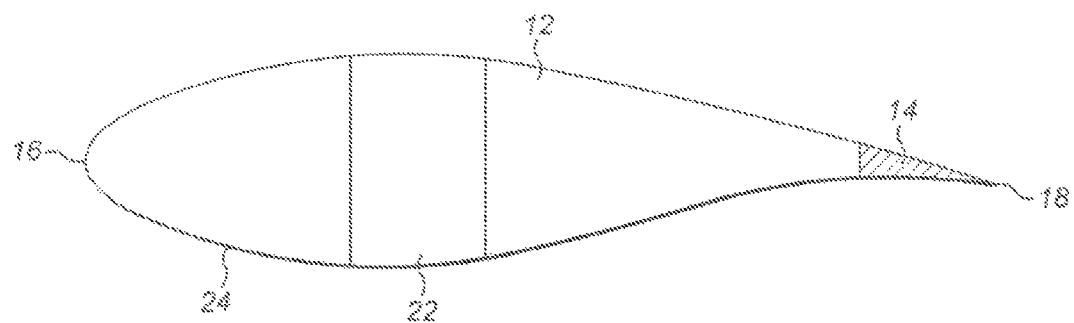
FIG. 5 is a schematic section view of the wind turbine blade of FIG. 4, showing the structural component and the trailing edge component as connected.
Figure 6:
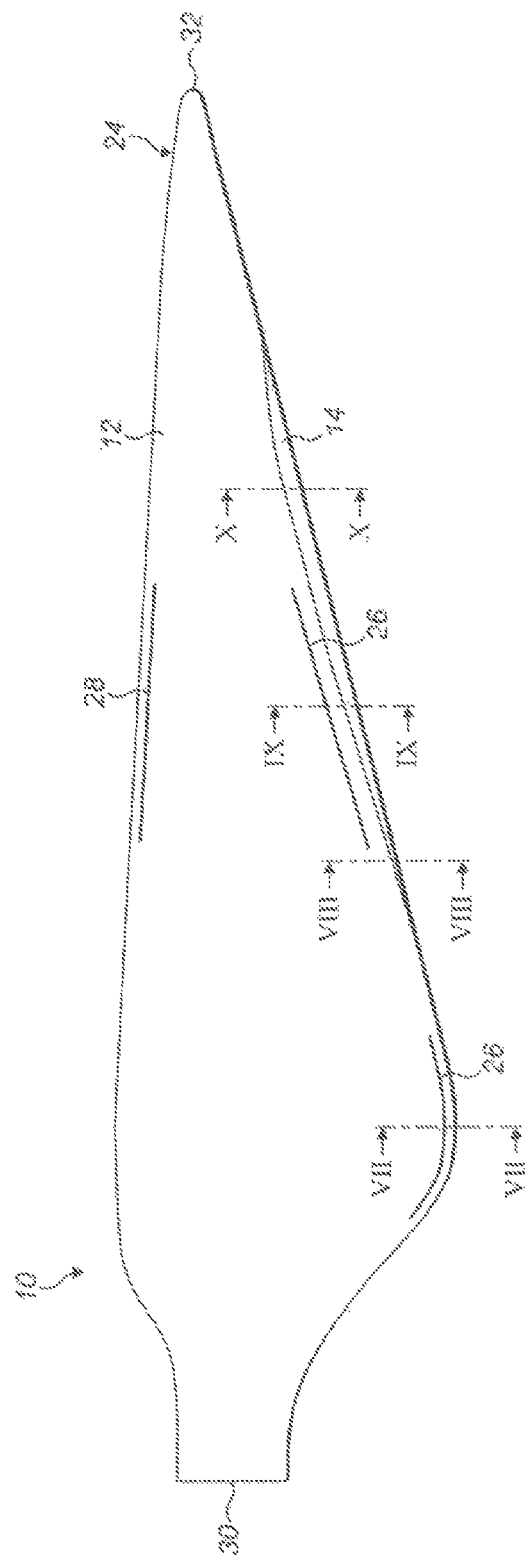
FIG. 6 is a schematic top view of a wind turbine blade in accordance with the present invention.

As shown in FIG. 4 and FIG. 5, the wind turbine blade 10 comprises a structural component 12 and a separate trailing edge component 14. The trailing edge component 14 is mounted on to the structural component 12 to form the aerodynamic profile of the blade 10, as shown in FIG. 5. As with conventional blades, the aerodynamic profile of blade 10 has a leading edge 16 and a trailing edge 18, as shown in FIG. 4.

The structural component 12 defines the leading edge 16 and the majority of the outer surface of the aerodynamic profile of the blade 10. As can be seen in FIG. 4 and FIG. 5 the aft-most part of the structural component 12 does not define the trailing edge 18 in this region. Instead, the structural component 12 has an attachment surface 20 to which the trailing edge component 14 is connected as described below, and the trailing edge component 14 defines the trailing edge 18. Consequently, the aft part of the structural component 12 can be made thicker to satisfy the edgewise strength, stiffness and local buckling requirements of the blade 10 in these regions without compromising the aerodynamic performance of the blade 10 as the trailing edge 18 is defined by the non-structural trailing edge 14 which can be very thin.

The structural component 12 comprises a load bearing spar 22 which extends along the length of the blade 10, as is well known in the art. An aerodynamic fairing 24 is mounted on the spar to form the outer surface of the structural component 12. The structural component can essentially be constructed in a similar manner to that described in our earlier application, International Patent Application Publication no. WO 2009/034291.

The trailing edge component 14 is non-rotatably attached to the attachment surface 20 of the structural component 12. The trailing edge component is also passive. By "passive" it is meant that there is no active drive mechanism to change the shape or orientation of the trailing edge component 14. Any changes to the shape or orientation of the trailing edge component 14 are brought about purely by the forces induced by the effects of the blade travelling through the air during use.

The trailing edge component 14 is shaped such that it extends from the structural component 12 in a continuous manner. In other words, the aerodynamic profile of the blade 10 defines a smooth curve having substantially no step between the outer surfaces of the structural component 12 and the trailing edge component 14. Depending on the position along the length of the blade 10, the trailing edge component 14 can represent between 0% and 25% of the chord of the blade 10.

As a very thin trailing edge, i.e. one with a thickness of less than 10 mm, will tend to buckle under loads which put the trailing edge in compression, the trailing edge component 14 is made from a material that is able to sustain large deformations elastically, where "large" is considered as a strain level of 2% or more. The typical strain in this part of the blade could be determined by well known Finite Element Modelling techniques for example. Suitable materials include rubber or any other polymer. Further, the material should be sufficiently stiff that deformation of the trailing edge component 14 during normal operation is negligible, i.e. less than 5 mm. This ensures that the aerodynamic properties of the blade 10 during normal use remain unchanged.

As the top and bottom surfaces of the trailing edge component 14 are connected, curved plates, the trailing edge component 14 exhibits stable post-buckling behaviour. Thus, the transverse deflections caused by buckling will stabilise quickly. In other words, the trailing edge component 14 remains temporarily buckled at a more or less constant deflection, i.e. there is no continual ripple.

The trailing edge component 14 can be made by casting, injection moulding, extrusion, or any other appropriate method.

In normal use, the blade 10 functions as a conventional wind turbine blade. However, in extreme operating conditions, the elastic nature of the trailing edge component 14 allows it to buckle temporarily when edgewise loads exceed a predetermined threshold, the threshold being defined as the point at which the loads exceed normal operating conditions. When the loading returns to that of normal operating conditions, i.e. when edgewise loading falls below the threshold, the trailing edge component 14 will recover its shape. Depending on the rheological characteristics of the material employed, the shape recovery may or may not be instantaneous.

As shown in FIG. 6 to FIG. 10, a reinforcing layer 26 is added to the aft part of the structural component 12 in the region of the root of the fairing where the chord is at its widest and midway between the root and the tip of the fairing 24 to increase its strength and stiffness. An additional reinforcing layer 28 is added to the leading edge part of the structural component 12 approximately midway between the root end 30 and the tip end 32 of the fairing 24.

Figure 7:
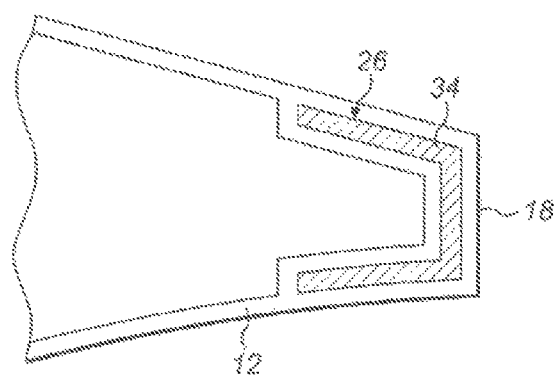
FIG. 7 is a schematic section view of the trailing edge of the wind turbine blade of FIG. 6 taken through line VII-VII.
Figure 9:
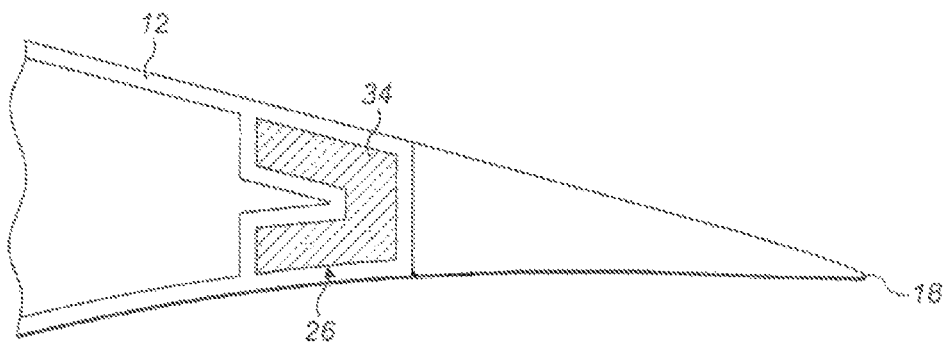
FIG. 9 is a schematic section view of the trailing edge of the wind turbine blade of FIG. 6 taken through line IX-IX.

Both the reinforcing layer 26 and the additional reinforcing layer 28 comprise layers of unidirectional reinforcing fibres (34: FIGS. 7 and 9) extending approximately parallel with the outer surface of the structural component 12 to increase the resistance of the structural component 12 to edgewise bending, thus reducing deflection and buckling of the trailing edge. Layers 26 and 28 are placed on top of and co-cured with the fibre reinforced plastic from which the structural component 12 is made such that they form an integral part of the structural component 12. Additional layers of reinforcing fibre can be added as required, i.e. in regions with an increased risk of buckling. The reinforcing layer 26 is one or two layers thick in the region of the root end 30 of the fairing 24 and the reinforcing layers 26 and 28 midway along the blade are 8 to 10 layers thick, for a 50 meter blade, or up to 60 layers thick for an 85 meter blade. The thicker, or "concentrated" regions, of the reinforcing layer 26 and additional reinforcing layer 28 extend along approximately one quarter to one third of the length of the blade 10 and are located approximately centrally along the blade 10. Other non-uni-directional fibers may also be included. For example, one or more layers of bi-axial fibers (±45°) may be included to increase resistance to transverse cracking.

Figure 8:
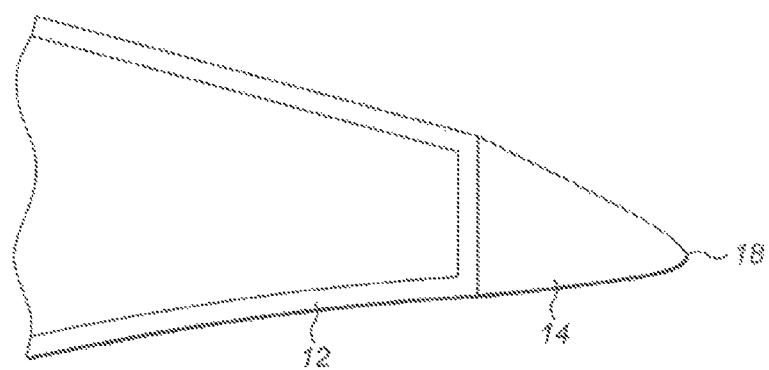
FIG. 8 is a schematic section view of the trailing edge of the wind turbine blade of FIG. 6 taken through line VIII-VIII.
Figure 10:
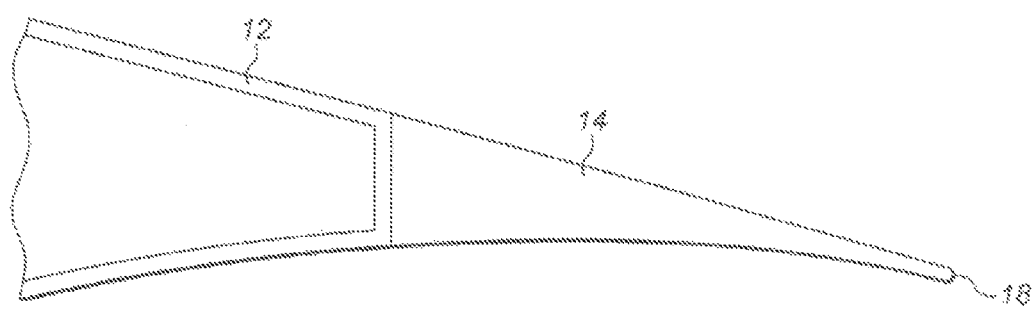
FIG. 10 is a schematic section view of the trailing edge of the wind turbine blade of FIG. 6 taken through line X-X.

The trailing edge component 14 does not extend from the structural component 12 along the entire length of the blade 10. Instead, the blade 10 has a flat back, formed by the aft end of the structural component 12, in the region of the root end 30 of the blade 10, as shown in FIG. 7. The chordwise dimension of the trailing edge component 14 gradually increases in the spanwise direction towards the tip 32 of the fairing 24 from zero at around ⅕ of the blade length to its full extent for around ⅕ of the blade length before tapering back to zero at around ¾ of the blade length and beyond the spanwise extent of reinforcement layers 26 and 28, as shown in FIGS. 8 to 10. For example, as measured from the root end 30 of the fairing 24 towards the tip, a 50 meter blade may have a trailing edge component 14 which is absent from the root end 30 of the fairing 24 to around 12 meters of the span, increases from zero to its full extent along the next 4 to 5 meters, remains at its full extent for approximately 10 to 13 meters, before tapering back to zero at around 35 meters.

Figure 11:
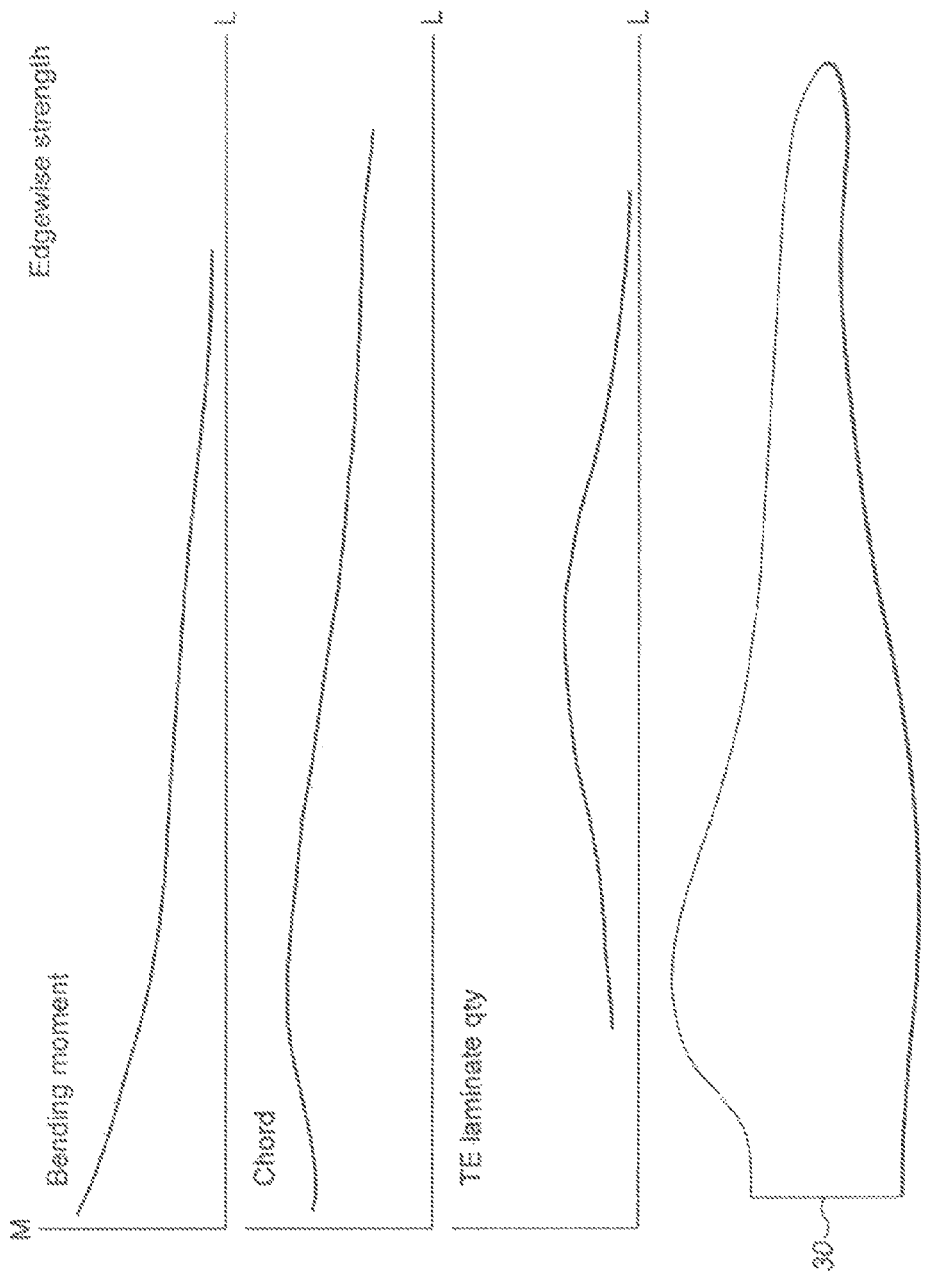
FIG. 11 is a graph showing the relationship between bending moment, chord size and optimal trailing edge component size along the blade span.

FIG. 11 shows the variations of bending moment (top graph), chord size (second graph) and requirement for uni-directional material (third graph) along the length of the blade (depicted at the bottom of FIG. 11).

Although the tangential velocity of the blade 10 is greatest at the blade tip 32, it is not necessary for the trailing edge component 14 to extend all the way to the tip 32. This is because the compressive forces which cause buckling (shown as the bending movement in FIG. 11) decrease from the root end 30 towards the blade tip 32, such that they are at their lowest at the blade tip 32. Consequently, the structural component 12 does not require reinforcement in the region of the blade tip 32 and can be made sufficiently thin to reduce noise levels without the need for a separate trailing edge component 14.

Conversely, although the compressive forces which cause buckling increase towards the root end 30, a separate trailing edge component is not required in this region as the chord is wider and hence the moment of inertia of the blade 10 is higher. However, despite the increase in the moment of inertia, the loads experienced at the widest point of the blade can increase by an even greater amount, particularly for very large blades. Therefore, a small amount of reinforcement can be beneficial in this region.

As a result of these effects, the need for increased reinforcement by the reinforcing layer 26 is greatest towards the centre of the blade and tapers off towards the root and tip.

Since the trailing edge 18 of the blade 10 is defined by the trailing edge component 14 in the noise and buckling-critical regions, rather than by the structural component 12, an increase in the thickness of the structural component 12 in the regions of reinforcement layers 26 and 28 will not result in a substantial increase in the noise levels generated by the blade or a decrease in its aerodynamic performance. Suitable strengthening material includes fibre reinforced plastics such as e-glass, s-glass, r-glass, carbon fibre, etc, combined with epoxy, polyester, vinylester, or polyurethane resins.

The trailing edge component 14 can be connected to the structural component 12 by any suitable means. Example means of connection can be seen in FIG. 12 to FIG. 16.

Figure 12:
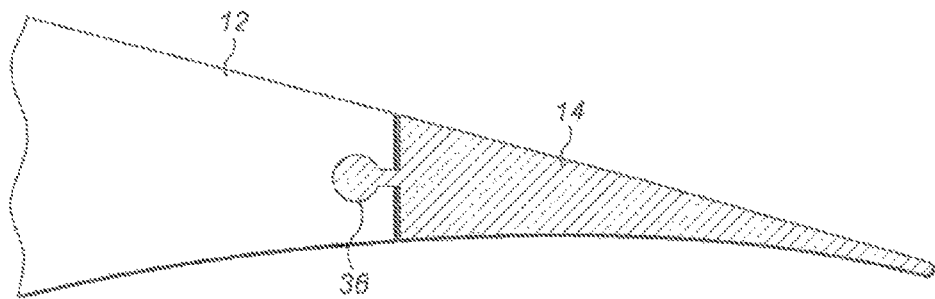
FIGS. 12 to 16 are enlarged views of the trailing edge of a wind turbine blade in accordance with the present invention, the trailing edge component and the structural component being connected by first to fifth alternative connection means, respectively.
Figure 13:
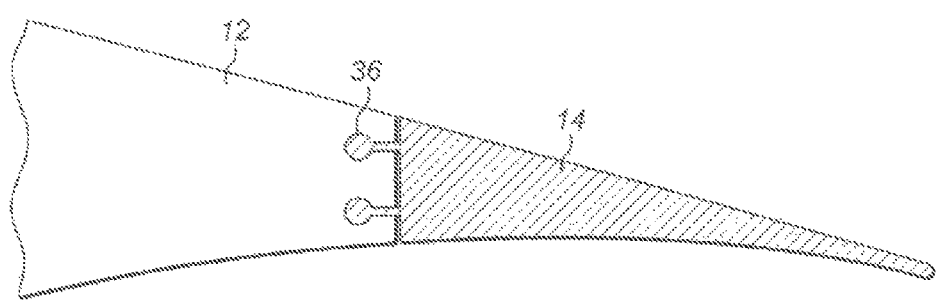

FIG. 12 and FIG. 13 show the trailing edge component 14 connected to the structural part 12 using a boltrope 36 (FIG. 12) or a pair of boltropes 36 (FIG. 13) held in a groove or grooves 38 set in the attachment surface 20 of the structural component 12.

Figure 14:
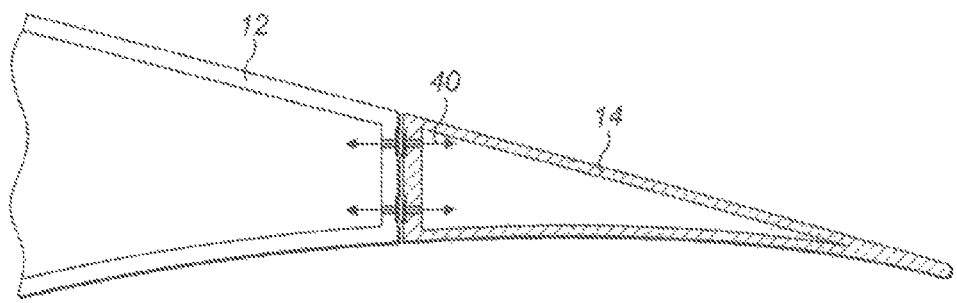

FIG. 14 shows the trailing edge component 14 connected to the structural part 12 using two locking clips 40. Although two clips 40 are shown, in practice, any suitable number of locking clips 40 may be used.

Figure 15:
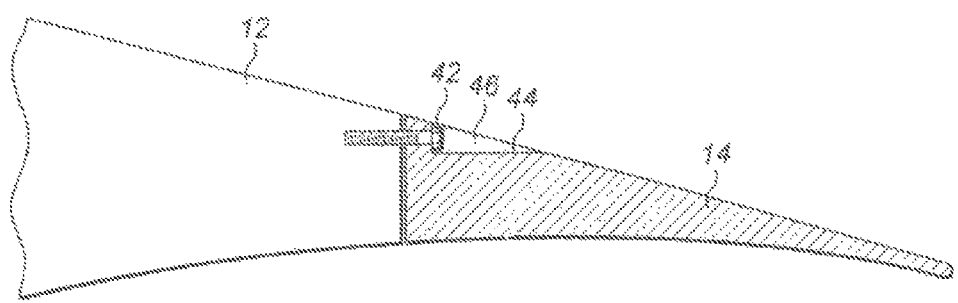

FIG. 15 shows the trailing edge component 14 connected to the structural part 12 using a fastener 42. The fastener 42 is set in a recess 44 in the trailing edge component 14 and the recess 44 is filled by a filler 46 to smooth the outer surface of the trailing edge component 14.

Figure 16:
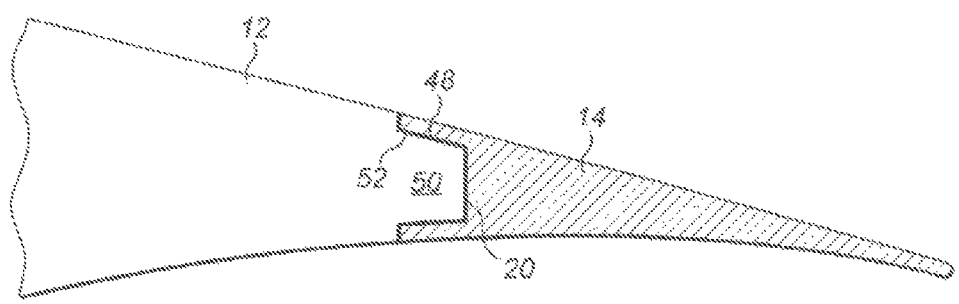

FIG. 16 shows the trailing edge component 14 connected to the structural part 12 using adhesive 48. To strengthen the joint, the attachment surface 20 has an extension 50 which fits in a corresponding groove 52 in the trailing edge component 14.

Although the trailing edge component 14 is described as extending along only part of the length of the blade 10 and increasing gradually in size before tapering off, it may extend along the entire blade 10, or any part thereof and/or have a constant chordwise dimension. For example, the trailing edge component could be fixed only to the outer 75% of the blade, where the compressive strains in the trailing edge and/or noise generation are most significant, or to the mid-section of the blade where buckling is more likely to occur.

What is claimed is:

1. A wind turbine blade comprising a fairing having an aerodynamic profile, the fairing comprising:
    a rigid structural component which forms the majority of the aerodynamic profile, the structural component comprising a trailing edge; and
    a non-actively controllable elastically deformable trailing edge component mounted to the trailing edge of the structural component to complete the aerodynamic profile,
    wherein the trailing edge component is formed from a material having an elastic modulus in the range of 0.5 to 2.5 GPa such that it elastically buckles when loading on the trailing edge component exceeds a predetermined threshold, and
    wherein the structural component comprises a unidirectional reinforcing layer extending across the trailing edge from a suction side to a pressure side of the aerodynamic profile and adjacent to the trailing edge component, the unidirectional reinforcing layer comprising at least one layer of unidirectional fibres extending in a substantially spanwise direction, the trailing edge component extending in the spanwise direction beyond the spanwise extent of the unidirectional reinforcing layer.

2. The wind turbine blade of claim 1, wherein the structural component further comprises an additional unidirectional reinforcing layer adjacent to its leading edge, the additional unidirectional reinforcing layer comprising at least one layer of unidirectional fibres extending in a substantially spanwise direction.

3. The wind turbine blade of claim 1, wherein the structural component is formed from a fibre reinforced plastic and the unidirectional reinforcing layer and/or an additional unidirectional reinforcing layer is co-cured with the fibre reinforced plastic such that it is an integral part of the structural component.

4. The wind turbine blade of claim 1, wherein the unidirectional reinforcing layer and/or an additional unidirectional reinforcing layer comprises a concentrated region of at least two layers of unidirectional fibres extending in a substantially spanwise direction.

5. The wind turbine blade according to claim 4, wherein the concentrated region comprises at least one layer of multiaxial fibres.

6. The wind turbine blade of claim 5, wherein a ratio of the layers of unidirectional fibres to multiaxial fibres in the concentrated region is at least 5:1.

7. The wind turbine blade of claim 4, wherein the concentrated region extends along less than half of a span of the fairing.

8. The wind turbine blade of claim 1, wherein the chordwise dimension of the trailing edge component increases in the spanwise direction towards the blade tip.

9. The wind turbine blade of claim 1, wherein the structural component has a blunt trailing edge in the vicinity of the blade root and the trailing edge component is absent at this point.

10. The wind turbine blade of claim 1, wherein the trailing edge component extends in the spanwise direction beyond the spanwise extent of an additional unidirectional reinforcing layer.

11. The wind turbine blade of claim 10, wherein the trailing edge component extends beyond the spanwise extent of the unidirectional reinforcing layer and/or an additional unidirectional reinforcing layer towards the blade tip.

12. The wind turbine blade of claim 1, wherein the trailing edge component is able to sustain elastically a strain of greater than 2%.

13. The wind turbine blade of claim 1, wherein the trailing edge component is made from a material selected from a group including rubber, silicon, acetal, ABS, nylon, acrylic, PBT, PET, polypropylene, PU, TPO, and polyethylene.

14. The wind turbine blade of claim 1, wherein the trailing edge component has a trailing edge tip thickness of less than 5 mm.

15. The wind turbine blade of claim 1, wherein the chordwise dimension of the trailing edge component at its widest point represents less than 25% of the chord length of the aerodynamic profile.

16. The wind turbine blade of claim 1, wherein the chordwise dimension of the trailing edge component is at its widest point inward of the blade tip and decreases from its widest point towards the blade tip.

17. The wind turbine blade of claim 1, wherein the trailing edge of the aerodynamic profile at the blade tip is formed by the structural component, whereas the trailing edge component is absent at this point.

18. The wind turbine blade of claim 1, wherein the trailing edge component comprises a unitary piece extending across at least 1 meter of the span of the fairing, preferably the unitary piece extends across at least 10 meters of the span of the fairing, more preferably the unitary piece extends across at least 20 meters of the span of the fairing.

19. The wind turbine blade of claim 1, wherein the structural component has a closed cross-section.

20. The wind turbine blade of claim 19, wherein an trailing edge end of the closed cross-section is defined by a structural wall on which the trailing edge component is mounted.

21. The wind turbine blade of claim 1, wherein the trailing edge component is non-pivotally mounted on the structural component.

22. The wind turbine blade of claim 1, wherein the trailing edge component is mounted on the structural component using a groove and boltrope arrangement.

23. The wind turbine blade of claim 1, wherein the trailing edge is mounted on the structural component using a locking clip.

24. The wind turbine blade of claim 1, wherein the aerodynamic profile formed by the structural component and the trailing edge component is continuous.

25. A method of preventing buckling of a trailing edge of a wind turbine blade having a fairing with an aerodynamic profile, the method comprising:
    providing a rigid structural component that forms a majority of the aerodynamic profile, the structural component having a trailing edge;
    mounting a non-actively controllable elastically deformable trailing edge component to the flat trailing edge of the structural component to complete the aerodynamic profile, the trailing edge component being formed from a material having an elastic modulus in the range of 0.5 to 2.5 GPa, the structural component having a unidirectional reinforcing layer extending across the trailing edge from a suction side to a pressure side of the aerodynamic profile and adjacent to the trailing edge component, the unidirectional reinforcing layer comprising at least one layer of unidirectional fibres extending in a substantially spanwise direction, the trailing edge component extending in the spanwise direction beyond the spanwise extent of the unidirectional reinforcing layer; and
    allowing the trailing edge component to elastically buckle when loading on the trailing edge component exceeds a predetermined threshold.

26. The wind turbine blade of claim 1, wherein the trailing edge of the structural component is flat.

27. The method of claim 25, wherein the trailing edge of the structural component is flat.

* * * * *